(12) United States Patent
Drozdzak et al.

(10) Patent No.: US 8,703,888 B2
(45) Date of Patent: Apr. 22, 2014

(54) INHIBITORS OF RUTHENIUM OLEFIN METATHESIS CATALYSTS

(75) Inventors: Renata Drozdzak, Bondues (FR); Alexander Daemen, Bondues (FR)

(73) Assignee: Rimtec Corporation, Tokyo (JP)

( * ) Notice: Subject to any disclaimer, the term of this patent is extended or adjusted under 35 U.S.C. 154(b) by 0 days.

(21) Appl. No.: 13/989,587

(22) PCT Filed: Dec. 1, 2011

(86) PCT No.: PCT/EP2011/071529
§ 371 (c)(1),
(2), (4) Date: May 24, 2013

(87) PCT Pub. No.: WO2012/072749
PCT Pub. Date: Jun. 7, 2012

(65) Prior Publication Data
US 2013/0237675 A1      Sep. 12, 2013

(30) Foreign Application Priority Data

Dec. 1, 2010   (EP) .................................... 10290633

(51) Int. Cl.
*C08F 4/80*       (2006.01)
*B01J 31/12*      (2006.01)
*B01J 31/18*      (2006.01)
*C08G 61/06*      (2006.01)

(52) U.S. Cl.
USPC ........... 526/145; 526/126; 526/171; 526/283; 502/155

(58) Field of Classification Search
USPC ........... 526/139, 145, 171, 126, 283; 502/155
See application file for complete search history.

(56) References Cited

U.S. PATENT DOCUMENTS

| | | | |
|---|---|---|---|
| 4,400,340 A | | 8/1983 | Klosiewicz |
| 4,943,621 A | | 7/1990 | Janda et al. |
| 5,939,504 A | | 8/1999 | Woodson, Jr. et al. |
| 2008/0293905 A9 | * | 11/2008 | Schaubroeck et al. ........ 526/283 |

FOREIGN PATENT DOCUMENTS

| | | |
|---|---|---|
| EP | 0 865 449 B1 | 10/2003 |
| EP | 1 577 282 A2 | 9/2005 |
| EP | 1 757 613 A1 | 2/2007 |
| EP | 2 280 017 A1 | 2/2011 |

OTHER PUBLICATIONS

Monsaert, S. et al., "Latent olefin metathesis catalysts", Chemical Society Reviews, 2009, 38, p. 3360-3372.
Ledoux, N. et al., "In situ generation of highly active olefin metathesis initiators", Journal of Organometalic Chemistry, 2006, 691, p. 5482-5486.
Sanford, M.S. et al., "Mechanism and Activity of Ruthenium Olefin Metathesis Catalysts", J. Am. Chem. Soc., 2001, 123. p. 6543-6554.
Dias, E. L. et al., "Well-Defined Ruthenium Olefin Metathesis Catalysts: Mechanism and Activity", J. Am. Chem. Soc., 1997, 119, p. 3887-3897.
P'Pool, S. J. et al., "Reversible Inhibition/Activation of Olefin Metathesis: A Kinetic Investigation of ROMP and RCM Reactions with Grubbs' Catalyst", J. Am. Chem. Soc., 2007, 129, p. 14200-14212.
Ritter, T. et al., "A Standard System of Characterization for Olefin Metathesis Catalysts", Organometallics, 2006, 25, p. 5740-5745.
International Search Report for PCT/EP2011/071529, mailing date of Mar. 5, 2012.
S. Monsaert et al., "Enhanced catalyst performance through activity control. Latent ruthenium catalysts in Ring-Opening Metathesis Polymerisation reactions", Chimica Oggi. Chemistry Today, vol. 26, No. 5, pp. 93-96, (2008).
S. Monsaert et al., "A Highly Controllable Latent Ruthenium Schiff Base Olefin Metathesis Catalyst: Catalyst Activation and Mechanistic Studies", Journal of Polymer Science: Part A: Polymer Chemistry, vol. 48, pp. 302-310, (2010).
R. Drozdzak et al., "Latent Olefin Metathesis Catalysts for Polymerization of Dcpd", Macromol. Symp., vol. 293, pp. 1-4, (2010).

* cited by examiner

*Primary Examiner* — Fred M Teskin
(74) *Attorney, Agent, or Firm* — Westerman, Hattori, Daniels & Adrian, LLP

(57) ABSTRACT

The present invention relates to a catalytic system comprising a precatalyst, a precatalyst activator and an inhibitor. Further, the invention relates to the use of this catalytic system in ring-opening metathesis polymerization reactions.

20 Claims, No Drawings

INHIBITORS OF RUTHENIUM OLEFIN METATHESIS CATALYSTS

FIELD OF THE INVENTION

The present invention relates to a catalytic system comprising a precatalyst, a precatalyst activator and an inhibitor. Further, the invention relates to the use of this catalytic system in ring-opening metathesis polymerisation reactions.

BACKGROUND OF THE INVENTION

Polydicyclopentadiene (poly-DCPD) is obtained through Ring Opening Metathesis Polymerisation (ROMP) of dicyclopentadiene (DCPD). 'ROMP reaction' is a metal carbene catalysed reaction using strained cyclic olefins to produce a wide range of polymers.

Poly-DCPD has excellent impact performance, superior chemical resistance, very low water absorption, very low dielectric constant and a high electrical strength.

Today's commercial DCPD formulations system based on molybdenum and tungsten are processed using Reaction Injection Moulding (RIM).

The tremendous development of stable well-defined ruthenium catalysts opens new possibility for poly-DCPD applications. The formulations based on ruthenium catalysts are no longer limited to RIM but can be potentially used in a variety of thermoset process such as filament winding, pultrusion, roto-moulding, casting, resin infusion.

The robust nature of the ruthenium catalysts allows using reinforcements such as glass fibre, mineral fibre, foaming agents and many types of fillers. The ideal catalyst for ROMP reactions should exhibit decreased activity in the presence of monomer at room temperature, so called latency. The main advantage of latent olefin metathesis catalysts is that it can be mixed with the monomers without concomitant polymerization, which allows for longer handling of the catalyst/monomer mixtures or even storage for longer periods (S. Monsaert, A. M. Lozano Vila, R. Drozdzak, P. Van Der Voort, F. Verpoort, Chemical Society Reviews, 2009, 38, 3360-3372).

Schiff base bearing ruthenium catalysts 1, 2a (Scheme 1), 2d (Scheme 2) have been found to be extremely latent in the presence of DCPD monomer and can be stored in DCPD based formulations for months without significant increase in viscosity.

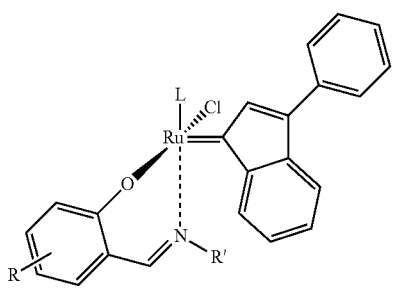

2a: R' = H, R = 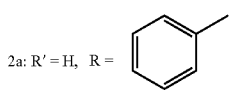

2b: R' = NO$_2$, R = 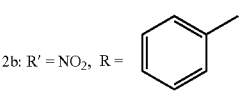

2c: R' = NO$_2$ R = 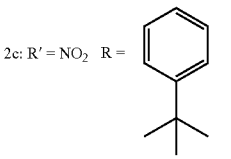

L = SIMes = 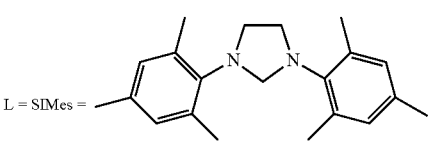

They also showed a high activity in ROMP of DCPD after chemical activation by Lewis or Brønsted acids such as: chlorosilanes or HCl. (N. Ledoux, B. Allaert, D. Schaubroeck, S. Monsaert, R. Drozdzak, P. Van Der Voort, F. Verpoort *Journal of Organometallic Chemistry* 2006, 691, 5482-5486. S. Monsaert, N. Ledoux, R. Drozdzak, F. Verpoort, *Journal of Polymer Science, Part A: Polymer Chemistry*, EP Patent Application No 092905785).

Recently we reported that the presence of the substituents in ortho position in N-aryl ring of salicylaldimine ligand is the main factor determining the catalyst latency of 2a-c in DCPD monomer.

Scheme 2. Ru-bissalicylaldimine phenylindenylidene catalyst

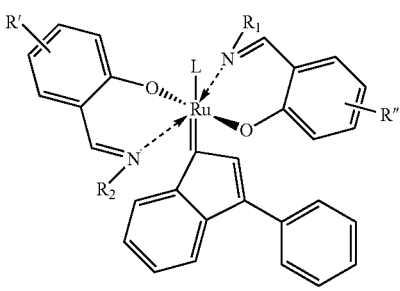

Scheme 1: Ru-salicylaldimine type of metathesis catalysts

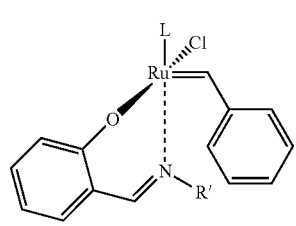

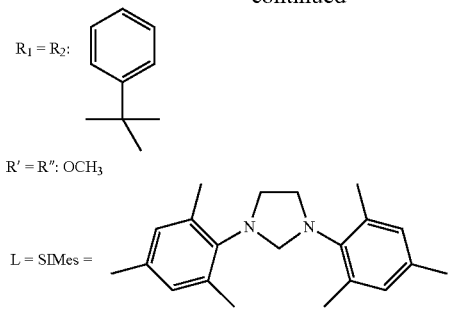

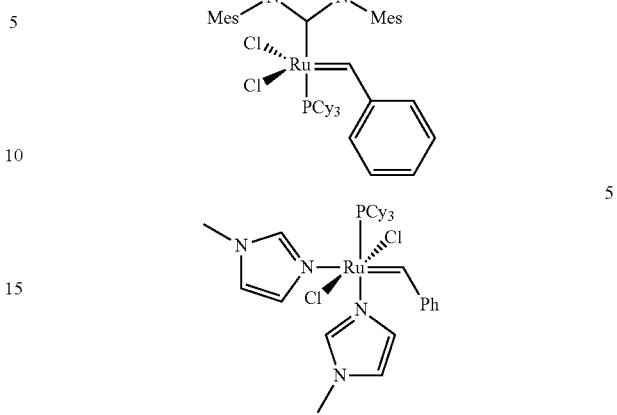

The best of the studied precatalysts 2a after chemical activation by trichlorosilanes offers activity comparable to that of the dichloride systems 4 in ROMP of DCPD, while maintaining very high stability in the monomer solution. Thus, new DCPD formulations based on the precatalysts 2a have been designed as two component systems, where the precatalysts and co-catalyst are dissolved into separated components. The polymerization reaction starts when two components are brought together. Typical working life time of precatalyst 2a/trichlorophenylsilane/DCPD monomer mixture is around 60 seconds at 20° C. The fast polymerization reaction is desirable for casting or RIM process, where short cycle time is usually economically favoured. However the ability to extend the working life becomes very important in the moulding of large parts, where the polymerization reaction should not start before mould is completely filled. The same holds for other processes such us RTM, filament-winding or resin infusion, in which low viscosity of monomer/catalysts mixture is needed in order to allow good penetration of the monomer through fibbers structures. In such cases the suitable working life is between 30 minutes to several hours depending on process and size of moulded parts.

The present invention relates to a method for controlling the initiation rate of the catalytic systems based on the ruthenium salicylaldimine precatalysts in ROMP of DCPD without compromising on thermal and physical properties of the polymer.

Several methods to decrease the initiation efficiency of a metathesis catalyst have been already reported. Significant reduction of the catalyst activity of the first generation catalyst type 3 (Scheme 3) in ROMP reactions was achieved when a gel modification additive such as: electron donors, Lewis bases and nucleophiles were added to the reaction mixture. The gel modification additive was assumed to modify the ligand environment of the catalyst. The amount of the additive used depended on the catalytic activity of the resulting catalyst formed in the reaction with the gel modification additive. In the Table 1 some examples of reported gel modification additives are presented.

Scheme 3: Grubbs type metathesis catalysts

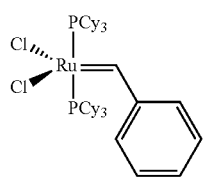

TABLE 1

Effect of addition of the gel modification additives on working life time of the catalysts 3 (Scheme 3) (EP Patent No 0865449)

| Entry | Gel modification additive | Additive content (w/w %) | Working life time (min) | Temp. ° C. |
|---|---|---|---|---|
| 1 | tricyclopentylphosphine | 0.11 | 21 | 160 |
| 2 | tricyclohexylphosphine | 0.23 | 11 | 184 |
| 3 | pyridine | 0.095 | 10 | 145 |
| 3 | triphenylphosphite | 0.13 | no reaction | |
| 4 | benzonitrile | 0.23 | too fast to measure | |
| 5 | furan | 0.23 | too fast to measure | |

The Lewis bases such as phosphites completely suppress the polymerization reaction while other additives such us ethers did not show any significant effect on the polymerization rate. However the complete deactivation of the catalyst is not useful, the ideal retardant should decrease the initiation rate without decreasing physical and thermal properties of the polymer. Only the phosphines and pyridine were found to be the most effective in extending working life times (Woodson Ch. S, Grubbs R. H. EP Patent No 0865449).

Significant reduction of the catalyst activity in ROMP reactions by addition of phosphine to the reaction mixture was reported by Stanford et al. This resulted in the decrease in phosphine ligand dissociation from the catalyst precursor and in lower concentrations of the active species, which cause slower polymerization rates (Stanford, M. S., Love, J. L.; Grubbs, R. H. J. Am. Chem. Soc. 2001, 123, 6543-6554). It has been shown, that one equivalent of $PCy_3$ slows down drastically RCM reaction of diethyl diallylmalonate catalyzed by first generation of Grubbs catalysts 3 to 5% of the initial activity (Dias, E. L.; Nguyen, S. T.; Grubbs, R. H. J. Am. Chem. Soc. 1997, 119, 3887-3897). Strak and co-workers reported that low amounts of 1-methylimidazole significantly slow down the cross metathesis reaction of 1-octene in ionic liquids.

Schanz and co-workers published a procedure that reversibly inhibits the ROMP of cyclooctene (COE) and norbornadiene with catalyst 3 in solution or in bulk with 2 or more equivalents of basic N-donor-ligands such as 1-methylimidazole (MIM) or 4-dimethylaminopyridine (DMAP) (S. J. P'Pool, H-J. Schanz, J. Am. Chem. Soc. 2007, 129, 14200-14212) This complete inhibition was attributed to the formation of a low-active hexacoordinate (N-donor)$_2$Rualkylidene species 5 (Scheme 3). It has been also demonstrated that the second generation Grubbs catalyst 4 can be strongly, but not completely, inhibited by 1-methylimidazole (MIM) even when a large excess is used.

To the best of our knowledge, all literature method describing the use of different additives to control the rate of ROMP reactions lead to modifications of the ligand environment of the catalysts. The influence of type of carbene moiety, nature of donor and anionic ligands, on catalyst performance and thermal stability has been investigated extensively, for the Grubbs first and second generation catalysts 3, 4 (Sanford, M. S.; Love, J. L.; Grubbs, R. H. *J. Am. Chem. Soc.* 2001, 123, 6543-6554; Dias, E. L.; Nguyen, S. T.; Grubbs, R. H. *J. Am. Chem. Soc.* 1997, 119, 3887-3897; Ritter, T.; Hejl, A.; Wenzel, A. G.; Funk, T. W.; Grubbs, R. H. *Organometallics* 2006, 25, 5740-5745).

A different concept has been described for the catalytic systems used in Reaction Injection Moulding (RIM) processes (U.S. Pat. Nos. 4,400,340 and 4,943,621). In such a case a molybdenum or tungsten containing catalyst precursor and an alkyl aluminium compound are in separated monomer streams and after mixing the active catalyst is formed. The stream containing the alkyl aluminium can include a compound such as: ester, ether, ketone, alcohols or phenols which inhibit the formation of the active catalyst. However, once the catalyst is formed the initiation is very fast and the polymerization reaction rate cannot be controlled.

All attempts to decrease the DCPD polymerization rates by adding different types previously described inhibitors in the presence ruthenium salicylaldimine/chlorosilane systems failed. This is attributed to strong N-donor character of the additives like 1-methylimidazole, which act as acid scavengers completely blocking the active catalyst formation. Other Lewis bases like triphenylphosphine, isochinoline, pyrazine gave the retardation of maximum 13 minutes (at 1 w/w %), however only polymers with decreased physical and thermal properties were obtained. Addition of ether, phenol, alcohol, keton or ester did not show any influence on the polymerization rate.

To date no inhibitor for the ROMP of DCPD catalysed by ruthenium salicylaldimine/chlorosilane catalytic system has been reported. Thus, there is a need for an efficient retardant that can allow controlling the polymerization rate and making these catalytic systems suitable for the processes where extended working life of monomer/catalyst mixture is required.

SUMMARY OF THE INVENTION

The invention provides a catalytic system comprising:
(a) a precatalyst comprising:
  (i) a ruthenium metal,
  (ii) at least one multidentate Schiff base ligand comprising an imino group and being coordinated to the metal, in addition to the nitrogen atom of said imino group, through at least one further heteroatom selected from the group consisting of oxygen, sulphur and selenium ligated to said metal,
  (iii) a nucleophilic carbene ligand ligated to said metal,
  (iv) a carbon-containing ligand ligated to said metal, wherein said carbon-containing ligand is a substituted or unsubstituted alkylidene, vinylidene or indenylidene ligand;
  (v) optionally, an anionic ligand different from the Schiff base ligand (ii),
(b) a precatalyst activator, and
(c) an inhibitor, wherein the inhibitor is selected from the group consisting of phosphites having formula $P(OR_1)(OR_2)(OR_3)$ where $R_1$, $R_2$, $R_3$ may be the same or different and are each selected from the group consisting of hydrogen, $C_1$-$C_{20}$ alkyl, $C_1$-$C_{20}$ heteroalkyl, $C_1$-$C_{20}$ alkoxy and aryl optionally substituted with one or more moieties selected from the group consisting of $C_1$-$C_{20}$ alkyl, $C_1$-$C_{20}$ heteroalkyl, $C_1$-$C_{20}$alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$alkoxy and aryl.

Further, the invention provides a process for the preparation of polyolefins by olefin metathesis comprising the step of reacting olefins at a suitable temperature optionally in a suitable solvent, wherein the reaction is carried out in the presence of a catalytic system as defined above.

DETAILED DESCRIPTION OF THE INVENTION

As mentioned above, the precatalyst used in the catalytic system according to the present invention comprises a ruthenium metal, a specific multidentate Schiff base ligand, a nucleophilic carbene ligand, a carbon-containing ligand wherein said carbon-containing ligand is a substituted or unsubstituted alkylidene, vinylidene or indenylidene ligand; and, optionally, an anionic ligand which is different from the Schiff base ligand.

The nucleophilic carbene ligand is not subject to any limitations and suitable nucleophilic carbene ligands are known to the skilled person. Preferably, the nucleophilic carbene ligand is selected from the group consisting of substituted or unsubstituted, saturated or unsaturated 1,3 diheteroatomic cyclic compounds, wherein the heteroatoms are nitrogen atoms, such as, for example, IMES and SIMES. Suitable Schiff base ligands comprising an imino group and being coordinated to the ruthenium metal, in addition to the nitrogen atom of said imino group, through at least one further heteroatom selected from the group consisting of oxygen, sulfur and selenium ligated to said metal, are also known to the skilled person and described, for example, in EP 1 577 282 and EP 1 757 613.

Most preferably the carbon-containing ligand is a phenylindenylidene ligand

Preferably, the Schiff base ligand is a salicylaldimine ligand.

In one embodiment of the invention, the multidentate Schiff base ligand has the formula:

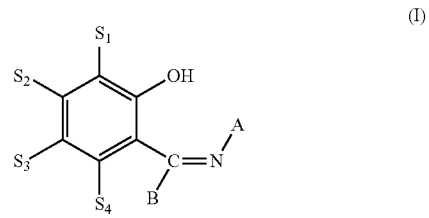

(I)

wherein
A is

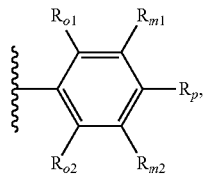

heteroaryl, substituted or unsubstituted alkyl, heteroalkyl or cycloalkyl;

B is hydrogen, $C_1$-$C_{20}$ alkyl, $C_1$-$C_{20}$ heteroalkyl aryl or heteroaryl, wherein each non-hydrogen group may be optionally substituted with one or more moieties selected from the group consisting of $C_1$-$C_{10}$ alkyl and aryl;

$R_{o1}$, $R_{o2}$, $R_{m1}$, $R_{m2}$ and $R_p$ are each selected from the group consisting of hydrogen, $C_1$-$C_{20}$ alkyl, $C_1$-$C_{20}$ heteroalkyl $C_1$-$C_{20}$ alkoxy, aryl, aryloxy, heteroaryl, heterocyclolalkyl, disulfide, carbonate, isocyanate, carbodiimide, carboalkoxy, carbamate and halogen, thioether, ketone, aldehyde, ester, ether, amine, amide, nitro, carboxylic acid, the non-hydrogen groups optionally substituted with one or more moieties selected from the group consisting of $C_1$-$C_{20}$ alkyl, $C_1$-$C_{20}$ alkoxy and aryl, wherein $R_{o1}$, $R_{o2}$, $R_{m1}$, $R_{m2}$ and $R_p$ can be joined to form a fused cyclic aliphatic or aromatic ring optionally substituted with one or more moieties selected from the group consisting of $C_1$-$C_{20}$ alkyl, $C_1$-$C_{20}$ heteroalkyl, $C_1$-$C_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl.

Preferably, the above mentioned substituents $S_1$ to $S_4$ of the multidentate Schiff base ligand of formula (I) include hydrogen, nitro, amino, substituted or unsubstituted mono- and dialkylamino, $C_1$-$C_{20}$ alkyl, thioalkyl, aryl and aryloxy.

Preferred examples of substituents $S_1$ to $S_4$ are selected from the group consisting of hydrogen, nitro, methoxy, methylthio, amino, dimethylamino, trifluoromethyl, trifluoromethoxy, t-butyl, phenyl, phenoxy, chloro, bromo, piperidinyl, 1-pyrrolidino, 4-tert-butylphenoxy and 2-pyridyl.

Suitable anionic ligands are also known to the skilled person and include anionic ligands selected from the group consisting of halide, carboxylate, alkyl sulfonate, alkoxy and aryloxy.

Preferably, the anionic ligand is chloride.

The anionic ligand is an optional ligand which may be replaced by a multidentate Schiff base ligand so that the precatalyst comprises, for example, two multidentate Schiff base ligands as shown in Scheme 2 above relating to Rubis (salicylaldimine) type of metathesis catalysts.

A preferred precatalyst for use in the catalytic system according to the present invention has the formula:

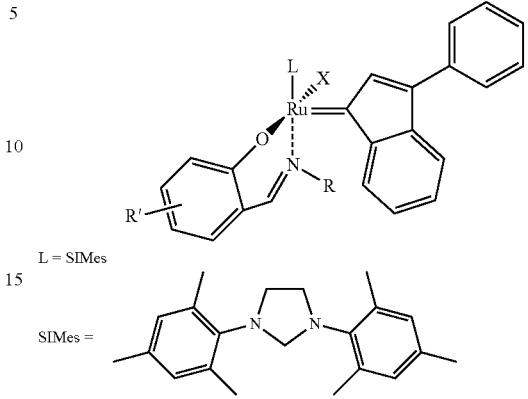

wherein R' is independently selected from the group consisting of nitro, aryl, $C_1$-$C_{20}$ alkyl, $C_2$-$C_{20}$ alkenyl, $C_2$-$C_{20}$ alkynyl, $C_2$-$C_{20}$ alkoxycarbonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_1$-$C_{20}$ alkylthio, $C_1$-$C_{20}$ alkylsulfonyl, $C_1$-$C_{20}$ alkylsulfinyl, hydrogen and halogen, wherein R' can be substituted with $C_1$-$C_5$ alkyl, halogen, $C_1$-$C_{10}$ alkoxy, or with a aryl group substituted with $C_1$-$C_5$ alkyl, $C_1$-$C_5$ aryloxy, halogen and wherein R is

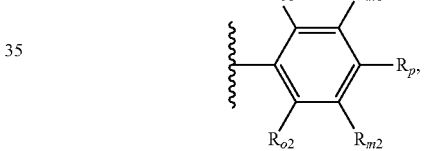

heteroaryl, substituted or unsubstituted alkyl, heteroalkyl or cycloalkyl;

$R_{o1}$, $R_{o2}$, $R_{m1}$, $R_{m2}$ and $R_p$ are each selected from the group consisting of hydrogen, $C_1$-$C_{20}$ alkyl, $C_1$-$C_{20}$ heteroalkyl $C_1$-$C_{20}$ alkoxy, aryl, aryloxy, heteroaryl, heterocyclolalkyl, disulfide, carbonate, isocyanate, carbodiimide, carboalkoxy, carbamate and halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl, wherein $R_{o1}$, $R_{o2}$, $R_{m1}$, $R_{m2}$ and $R_p$ can be joined to form a fused cyclic aliphatic or aromatic ring optionally substituted with one or more moieties selected from the group consisting of $C_1$-$C_{20}$ alkyl, $C_1$-$C_{20}$ heteroalkyl, $C_1$-$C_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl, wherein X is selected from the group consisting of halide, carboxylate, alkyl sulfonate, alkoxy and aryloxy; and wherein L is a nucleophilic carbene ligand as defined above.

Another preferred precatalyst for use in the catalytic system according to the present invention has the formula

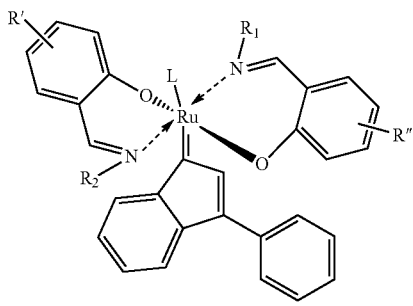

L = SIMes

SIMes = 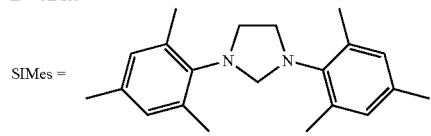

wherein R' and R" are the same or different and are independently selected from the group consisting of nitro, aryl, $C_1$-$C_{20}$ alkyl, $C_2$-$C_{20}$ alkenyl, $C_2$-$C_{20}$ alkynyl, $C_2$-$C_{20}$ alkoxycarbonyl, aryl, $C_1$-$C_{20}$ carboxylate, alkoxy, $C_2$-$C_{20}$ alkenyloxy, $C_2$-$C_{20}$ alkynyloxy, aryloxy, alkylthio, $C_1$-$C_{20}$ alkylsulfonyl, $C_1$-$C_{20}$ alkylsulfinyl, hydrogen and halogen, wherein R' can be substituted with $C_1$-$C_5$ alkyl, halogen, $C_1$-$C_{10}$ alkoxy, or with a aryl group substituted with $C_1$-$C_5$ alkyl, $C_1$-$C_5$ aryloxy, halogen and wherein $R_1$ and $R_2$ is

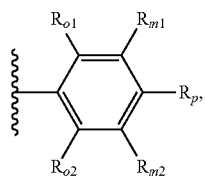

heteroaryl, substituted or unsubstituted alkyl, heteroalkyl or cycloalkyl;

$R_{o1}$, $R_{o2}$, $R_{m1}$, $R_{m2}$ and $R_p$ are each selected from the group consisting of hydrogen, $C_1$-$C_{20}$ alkyl, $C_1$-$C_{20}$ heteroalkyl $C_1$-$C_{20}$ alkoxy, aryl, aryloxy, heteroaryl, heterocyclolalkyl, disulfide, carbonate, isocyanate, carbodiimide, carboalkoxy, carbamate and halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$alkoxy and aryl, wherein $R_{o1}$, $R_{o2}$, $R_{m1}$, $R_{m2}$ and $R_p$ can be joined to form a fused cyclic aliphatic or aromatic ring optionally substituted with one or more moieties selected from the group consisting of $C_1$-$C_{20}$alkyl, $C_1$-$C_{20}$ heteroalkyl, $C_1$-$C_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$alkoxy and aryl.

Examples of the above mentioned precatalysts comprising two Schiff base ligands are disclosed in European patent application 09 290 578 which is hereby incorporated by reference and include the following compounds of formulae 6 to 10:

6

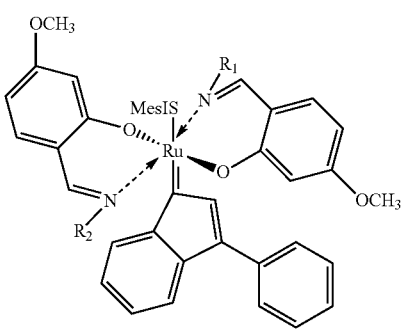

$R_1 = R_2 =$ 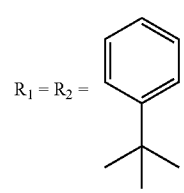

7

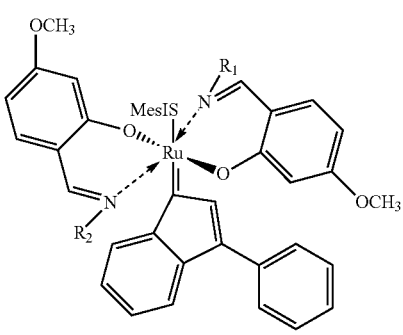

$R_1 = R_2 =$ 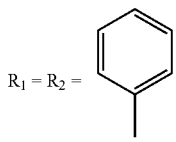

8

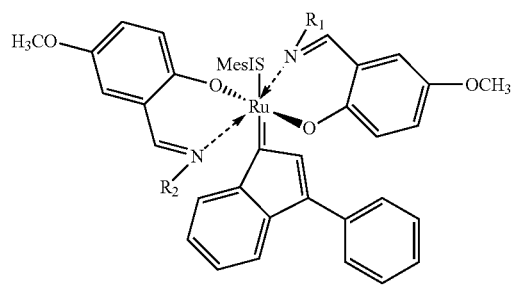

$R_1 = R_2 =$ 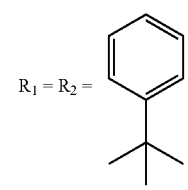

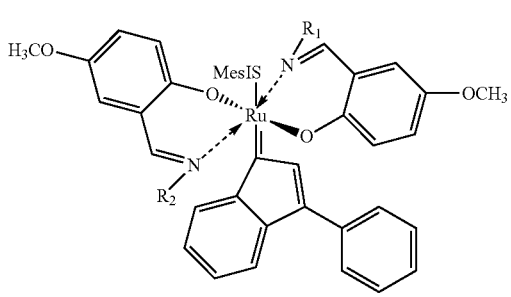

9

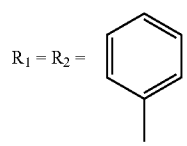

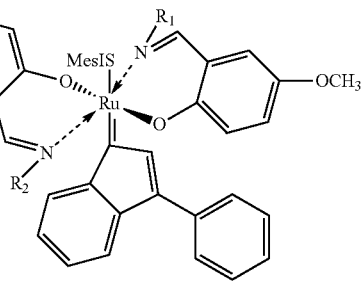

10

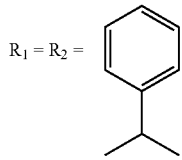

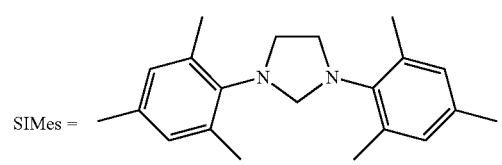

As mentioned above, the concept of activating precatalysts with a precatalyst activator is known in the state of the art. These activators include Lewis and Brønsted acids such as chlorosilanes or HCl. These compounds can also be used as precatalyst activator in the catalytic system according to the present invention.

Preferably, the precatalyst activator is a chlorosilane having the formula $SiCl_3R$, wherein R is selected from the group consisting of hydrogen, $C_1$-$C_{20}$ alkyl, $C_1$-$C_{20}$ heteroalkyl $C_1$-$C_{20}$ alkoxy, aryl, aryloxy and heteroaryl.

The inhibitor for use in the catalytic system according to the present invention is selected from the group consisting of phosphites having formula $P(OR_1)(OR_2)(OR_3)$ where $R_1$, $R_2$, $R_3$ may be the same or different and are each selected from the group consisting of hydrogen, $C_1$-$C_{20}$ alkyl, $C_1$-$C_{20}$ heteroalkyl, $C_1$-$C_{20}$ alkoxy and aryl optionally substituted with one or more moieties selected from the group consisting of $C_1$-$C_{20}$ alkyl, $C_1$-$C_{20}$ heteroalkyl, $C_1$-$C_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl.

Preferably, the inhibitor is a trialkyl phosphite compound such as trimethylphosphite or triethylphosphite The molar ratio of phosphite/ruthenium is preferably in the range of 0.01 to 300.

The molar ratio of phosphite/ruthenium is most preferably in the range of 0.1 to 160.

Further, it is preferred that the molar ratio of phosphite/activator is 0.007 to 1000

Further, it is most preferred that the molar ratio of phosphite/activator is 0.01 to 200

In a preferred catalytic system according to the present invention the precatalst activator is trichlorophenylsilane and the phosphite inhibitor is trimethylphosphite or triethylphosphite.

According to a preferred embodiment, the molar ratio trimethylphosphite/trichlorophenylsilane is from 0.03 to 45.

The use of the catalytic system according to the present invention provides a straight-forward method to control the activity of acid activated ruthenium Schiff base complexes, based on a reversible inhibition of the precatalyst activator such as chlorosilane co-catalysts. The present invention is based on the unexpected finding that phosphite compounds as defined hereinabove including alkyl phosphites, such as trimethylphosphite, unexpectedly exhibit a strong inhibiting effect on the rate of DCPD polymerisation but do not result in a complete suppression of the polymerisation reaction and do not decrease the physical and thermal properties of the obtained polymers as shown in Table 2 below:

TABLE 2

Effect of trimethylphosphite (TMP), triethylhosphite (TEP), tributylphosphite (TBP) and triisodecylphosphite (TIDP) on ROMP of DCPD catalysed by 2a/$PhSiCl_3$ system

| Entry | Phosphite type | Content (w/w %) | [P]/$PhSiCl_3$ | Working life (min) | Tg |
|---|---|---|---|---|---|
| 1 | none | 0 | 0 | 1 | 156 |
| 2 | trimethylphosphite | 0.01 | 1 | 20 | 156 |
| 3 | trimethylphosphite | 0.05 | 1 | 115 | 168 |
| 4 | triethylphosphite | 0.005 | 0.08 | 5 | 156 |
| 5 | triethylphosphite | 0.01 | 0.16 | 13 | 156 |
| 6 | tributylphosphite | 0.05 | 1.6 | 4 | 156 |
| 7 | tributylphosphite | 0.1 | 3.2 | 7 | 159 |
| 8 | triisodecylphosphite | 0.1 | 0.5 | 7 | 159 |

Conditions: 100 g of DCPD monomer, room temperature, [Ru]/[$PhSiCl_3$] = 15

Addition of very low amounts of trimethylphosphit (TMP) (0.01 w/w %) caused already a significant shift of reactivity up to 15 min in typical conditions (Table 2).

The inhibiting ability of TMP is a function of the TMP/chlorosilane ratio, and the longer inhibition periods were achieved by decreasing chlorosilane co-catalyst concentration (cf. Table 3). Surprisingly when a lower concentration of co-catalyst was applied, polymers with improved thermal and physical properties were obtained compared to those obtained by the uninhibited catalytic system (cf. Table 3).

The reduction of the chlorosilane concentration is also very desirable to eliminate problems of corrosion, toxicity, as well as many difficulties in processing.

TABLE 3

Inhibiting capability of TMP in the ROMP of DCPD catalysed by 2a/PhSiCl$_3$ system

| Entry | SiPhCl$_3$/Ru | [P]/[SiPhCl$_3$] | Working life (min) | Tg$^a$ |
|---|---|---|---|---|
| 1 | 15 | — | 1 | 156 |
| 2 | 2.6 | 6 | 73 | 166 |
| 3 | 2 | 7.9 | 110 | 167 |
| 4 | 1 | 15.7 | 136 | 169 |
| 5 | 0.6 | 26.2 | 170 | 170 |

Conditions: 100 g of DCPD monomer, room temperature, [Ru]/[PhSiCl$_3$] = 15.7

We also assessed the inhibiting ability of TMP with catalysts 4 in the ROMP of DCPD in comparison with the uninhibited catalyst 4 and inhibited 2a/PhSiCl$_3$ system (Table 4).

In contrast to the 2a/TMP/PhSiCl$_3$, the addition of 0.05% of TMP to the reaction mixture containing catalyst 4 is sufficient to completely suppress the ROMP of DCPD at normal conditions.

Significantly better results have been observed, by using 2a-d/TMP/PhSiCl$_3$ systems, where the working life time has been extended 136 times compared to the uninhibited 2a/PhSiCl$_3$ system but the catalytic activity was not completely suppressed and after the inhibition period the polymerization reaction occurs at room temperature resulting in the polymers with enhanced physical and thermal properties. The effect of the phosphite addition to 2a-d/PhSiCl3 systems is highly superior to that of the conventional retardants and provides a very useful way to sufficiently modify the polymerization rates.

This experimental evidence demonstrates that phosphite compounds can be successfully used in catalytic systems comprising Schiff base ligands to allow inhibition of DCPD polymerisation. These inhibitors are substances that inhibit ROMP of DCPD in a reversible manner without decreasing the thermal and physical properties of the polymer obtained. Further, the inhibitor does not change the ligand environment in the precatalyst structure.

TABLE 4

Inhibiting capability of TMP in the ROMP of DCPD catalysed by the catalyst 4 and 2/PhSiCl$_3$ system

| Entry | Catalyst type | Retardant type | Retardant content (w/w %) | [P]/[Ru] | [P]/(SiPhCl$_3$) | Working life (min) | Tg |
|---|---|---|---|---|---|---|---|
| 1 | 2a | — | — | — | — | 1 | 156 |
| 2 | 2a | TMP | 0.05 | 15.7 | 15.7 | 136 | 167 |
| 3 | 2a | TEP | 0.05 | 11.9 | 11.9 | 121 | 165 |
| 4 | 2b | — | — | — | — | 30 | 120 |
| 4 | 2b | TMP | 0.05 | 11.3 | 15.7 | 160 | 135 |
| 5 | 2c | — | — | — | — | 0.16 | 165 |
| 6 | 2c | TMP | 0.05 | 10.8 | 23.5 | 180 | 165 |
| 7 | 2d | — | — | — | — | 0.16 | 165 |
| 8 | 2d | TMP | 0.05 | 8.7 | 23.5 | 8 | 165 |
| 10 | 4 | — | — | — | — | 20 | 161 |
| 11 | 4 | TMP | 0.05 | 15.6 | — | no reaction | |

Conditions: 100 g of DCPD monomer, room temperature,

The invention claimed is:

1. A catalytic system comprising:
   (a) a precatalyst comprising:
      (i) a ruthenium metal,
      (ii) at least one multidentate Schiff base ligand comprising an imino group and being coordinated to the metal, in addition to the nitrogen atom of said imino group, through at least one further heteroatom selected from the group consisting of oxygen, sulphur and selenium ligated to said metal,
      (iii) a nucleophilic carbene ligand ligated to said metal,
      (iv) a carbon-containing ligand ligated to said metal, wherein said carbon-containing ligand is a substituted or unsubstituted alkylidene, vinylidene or indenylidene ligand,
      (v) optionally, an anionic ligand different from the Schiff base ligand (ii),
   (b) a precatalyst activator, and
   (c) an inhibitor,
   wherein the inhibitor is selected from the group consisting of phosphites having formula P(OR$_1$)(OR$_2$)(OR$_3$) where R$_1$, R$_2$, R$_3$ may be the same or different and are each selected from the group consisting of hydrogen, C$_1$-C$_{20}$ alkyl, C$_1$-C$_{20}$ heteroalkyl, C$_1$-C$_{20}$ alkoxy and aryl optionally substituted with one or more moieties selected from the group consisting of C$_1$-C$_{20}$ alkyl, C$_1$-C$_{20}$ heteroalkyl, C$_1$-C$_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups optionally substituted with one or more moieties selected from the group consisting of C$_1$-C$_{20}$ alkyl, C$_1$-C$_{20}$ alkoxy and aryl.

2. The catalytic system of claim 1, wherein the nucleophilic carbene ligand is selected from the group consisting of substituted or unsubstituted, saturated or unsaturated 1,3 diheteroatomic cyclic compounds, wherein the heteroatoms are nitrogen atoms.

3. The catalytic system of claim 1, wherein multidentate Schiff base ligand is a salicylaldimine ligand.

4. The catalytic complex of claim 1 wherein the carbon-containing ligand is phenylindenylidene.

5. The catalytic system of claim 4, wherein the anionic ligand is chloride.

6. The catalytic system of claim 4, wherein said precatalyst activator is a chlorosilane having the formula SiCl$_3$R, wherein R is selected from the group consisting of hydrogen, C$_1$-C$_{20}$ alkyl, C$_1$-C$_{20}$ heteroalkyl, C$_1$-C$_{20}$ alkoxy, aryl, aryloxy and heteroaryl.

7. The catalytic system of claim 4, wherein the molar ratio phosphite/ruthenium is from 0.01 to 300.

8. The catalytic system of claim 4, wherein the molar ratio phosphite/activator is from 0.007 to 1000.

9. The catalytic system of claim 4, wherein said phosphite is trialkylphosphite.

10. The catalytic system of claim 1, wherein said precatalyst has the formula:

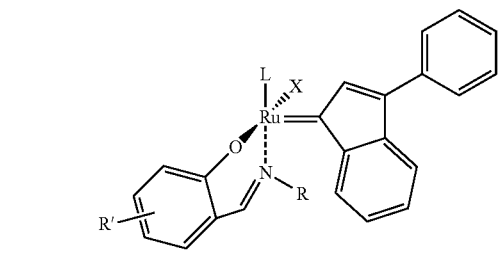

L = SIMes

SIMes =

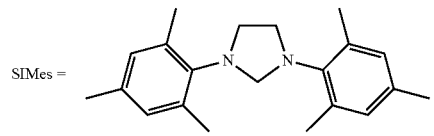

wherein R' is independently selected from the group consisting of nitro, aryl, $C_1$-$C_{20}$ alkyl, $C_2$-$C_{20}$ alkenyl, $C_2$-$C_{20}$ alkynyl, $C_2$-$C_{20}$ alkoxycarbonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_1$-$C_{20}$ alkylthio, $C_1$-$C_{20}$ alkylsulfonyl, $C_1$-$C_{20}$ alkylsulfinyl, hydrogen and halogen, wherein R' can be substituted with $C_1$-$C_5$ alkyl, halogen, $C_1$-$C_{10}$ alkoxy, or with an aryl group substituted with $C_1$-$C_5$ alkyl, $C_1$-$C_5$ aryloxy, halogen and wherein R is

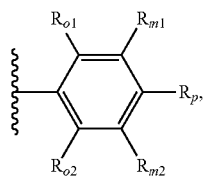

heteroaryl, substituted or unsubstituted alkyl, heteroalkyl or cycloalkyl;

$R_{o1}$, $R_{o2}$, $R_{m1}$, $R_{m2}$ and $R_p$ are each selected from the group consisting of hydrogen, $C_1$-$C_{20}$ alkyl, $C_1$-$C_{20}$heteroalkyl $C_1$-$C_{20}$alkoxy, aryl, aryloxy, heteroaryl, heterocyclolalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$alkoxy and aryl, wherein $R_{o1}$, $R_{o2}$, $R_{m1}$, $R_{m2}$ and $R_p$ can be joined to form a fused cyclic aliphatic or aromatic ring optionally substituted with one or more moieties selected from the group consisting of $C_1$-$C_{20}$alkyl, $C_1$-$C_{20}$heteroalkyl, $C_1$-$C_{20}$alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$alkyl, $C_1$-$C_{20}$alkoxy and aryl;

wherein X is selected from the group consisting of halide, carboxylate, alkyl sulfonate, alkoxy and aryloxy; and wherein L is a nucleophilic carbene ligand.

11. The catalytic system of claim 1, wherein the anionic ligand is chloride.

12. The catalytic system of claim 1, wherein said precatalyst has the formula:

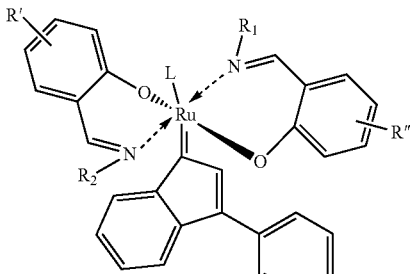

L = SIMes

SIMes =

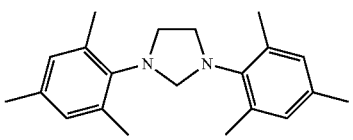

wherein R' and R" are the same or different and are independently selected from the group consisting of nitro, aryl, $C_1$-$C_{20}$ alkyl, $C_2$-$C_{20}$ alkenyl, $C_2$-$C_{20}$ alkynyl, $C_2$-$C_{20}$ alkoxycarbonyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, $C_1$-$C_{20}$ alkylthio, $C_1$-$C_{20}$ alkylsulfonyl, $C_1$-$C_{20}$ alkylsulfinyl, hydrogen and halogen, wherein R' can be substituted with $C_1$-$C_5$ alkyl, halogen, $C_1$-$C_{10}$ alkoxy, or with a aryl group substituted with $C_1$-$C_5$ alkyl, $C_1$-$C_5$ aryloxy, halogen and wherein $R_1$ and $R_2$ is

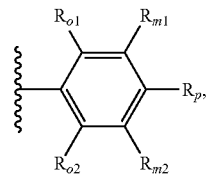

heteroaryl, substituted or unsubstituted alkyl, heteroalkyl or cycloalkyl;

$R_{o1}$, $R_{o2}$, $R_{m1}$, $R_{m2}$ and $R_p$ are each selected from the group consisting of hydrogen, $C_1$-$C_{20}$ alkyl, $C_1$-$C_{20}$ heteroalkyl $C_1$-$C_{20}$ alkoxy, aryl, aryloxy, heteroaryl, heterocyclolalkyl, disulfide, carbonate, isocyanate, carbodiimide, carboalkoxy, carbamate and halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl, wherein $R_{o1}$, $R_{o2}$, $R_{m1}$, $R_{m2}$ and $R_p$ can be joined to form a fused cyclic aliphatic or aromatic ring optionally substituted with one or more moieties selected from the group consisting of $C_1$-$C_{20}$ alkyl, $C_1$-$C_{20}$ heteroalkyl, $C_1$-$C_{20}$ alkoxy, aryl, aryloxy, heteroaryl, heterocycloalkyl, disulfide, carbonate, isocyanate, carbodiimide, carboalkoxy, carbamate, halogen, thioether, ketone, aldehyde, ester, ether, amine, amide, nitro and carboxylic acid, the non-hydrogen groups being optionally substituted with one or more moieties selected from the group consisting of $C_1$-$C_{20}$ alkyl, $C_1$-$C_{20}$ alkoxy and aryl.

13. The catalytic system of claim 1, wherein said precatalyst activator is a chlorosilane having the formula $SiCl_3R$, wherein R is selected from the group consisting of hydrogen, $C_1$-$C_{20}$ alkyl, $C_1$-$C_{20}$ heteroalkyl $C_1$-$C_{20}$ alkoxy, aryl, aryloxy and heteroaryl.

14. The catalytic system of claim 1, wherein the molar ratio phosphite/ruthenium is from 0.01 to 300.

15. The catalytic system of claim 1, wherein the molar ratio phosphite/activator is from 0.007 to 1000.

16. The catalytic system of claim 1, wherein said phosphite is trialkylphosphite.

17. The catalytic system of claim 13, wherein said chlorosilane is trichlorophenylsilane and said trialkylphosphite is trimethylphosphite.

18. The catalytic system of claim 17, wherein the molar ratio trimethylphosphite/trichlorophenylsilane is from 0.03 to 45.

19. A process for the preparation of polyolefins by olefin metathesis comprising a step of reacting olefins at a suitable temperature optionally in a suitable solvent, wherein the reaction is carried out in the presence of a catalytic system according to claim 1.

20. The process of claim 19, wherein the olefin metathesis polymerisation is a ring opening metathesis polymerisation (ROMP).

* * * * *